United States Patent [19]

Sauer et al.

[11] Patent Number: 5,176,836
[45] Date of Patent: Jan. 5, 1993

[54] REGENERABLE BIOCIDE DELIVERY UNIT

[75] Inventors: Richard L. Sauer, League City, Tex.; Gerald V. Colombo, Myrtle Creek; Clifford D. Jolly, Roseburg, both of Oreg.

[73] Assignee: The United States of America as represented by the Administrator of the National Aeronautics and Space Administration, Washington, D.C.

[21] Appl. No.: 671,603

[22] Filed: Mar. 18, 1991

[51] Int. Cl.⁵ .............................................. C02F 1/76
[52] U.S. Cl. ................................... 210/670; 210/739; 210/753; 210/764; 210/96.1; 210/140; 210/190; 210/206; 210/209; 210/275; 210/501
[58] Field of Search ............... 210/202, 206, 209, 259, 210/264, 266, 753, 663, 668, 669, 670, 673, 675, 679, 96.1, 140, 275, 277, 190, 758, 764, 501, 263, 739, 746; 422/37, 211

[56] References Cited

U.S. PATENT DOCUMENTS

| | | | |
|---|---|---|---|
| 2,435,366 | 2/1948 | Riche | 210/96.1 |
| 3,627,133 | 12/1971 | Rak | 210/140 |
| 3,772,189 | 11/1973 | Kreutsch et al. | 210/753 |
| 3,817,860 | 6/1974 | Lambert et al. | 210/29 |
| 3,923,366 | 12/1975 | Olashaw | 339/252 |
| 3,923,665 | 12/1975 | Lambert et al. | 210/501 |
| 4,061,570 | 12/1977 | Fletcher et al. | 210/96.1 |
| 4,131,645 | 12/1978 | Keblys et al. | 423/501 |
| 4,190,529 | 2/1980 | Hatch | 210/753 |
| 4,224,154 | 9/1980 | Steininger | 210/96.1 |
| 4,228,000 | 10/1980 | Hoeschler | 210/673 |
| 4,238,477 | 12/1980 | Lambert et al. | 210/501 |
| 4,420,590 | 12/1983 | Gartner | 210/764 |
| 4,764,280 | 8/1988 | Brown et al. | 210/96.1 |
| 4,830,757 | 5/1989 | Lynch | 210/746 |
| 4,849,111 | 7/1989 | Abrams | 210/673 |
| 4,855,043 | 8/1989 | Dalton | 210/190 |
| 4,888,118 | 12/1989 | Barnes et al. | 210/668 |
| 5,011,613 | 4/1991 | Feray et al. | 210/754 |
| 5,022,994 | 6/1991 | Avery et al. | 210/96.1 |

Primary Examiner—Stanley S. Silverman
Assistant Examiner—Cynthia L. Nessler
Attorney, Agent, or Firm—Hardie R. Barr; Guy M. Miller; Edward K. Fein

[57] ABSTRACT

A method and apparatus are disclosed for maintaining continuous, long-term microbial control in the water supply for potable, hygiene, and experimental water for space activities, i.e., space shuttle, orbiter lab, Lunar base, Mars base, deep space missions, etc., as well as treatment of water supplies on earth. The water purification is accomplished by introduction of molecular iodine into the water supply to impart a desired iodine residual. The water is passed through an iodinated anion exchange resin bed. The iodine is bound as $I^-_n$ at the anion exchange sites and releases $I_2$ into the water stream flowing through the bed. Suitable anion exchange resins are Amberlite IRA 401S (Rohm & Haas); Dowex SBR (Dow Chemical); and Ionac ASB-1P (Sybron Corp.). The concentration of $I_2$ in the flowing water gradually decreases and the ion-exchange bed has had to be replaced. In a preferred embodiment, a bed of iodine crystals is provided with connections for flowing water therethrough to produce a concentrated (substantially saturated) aqueous iodine solution which is passed through the iodinated resin bed to recharge the bed with bound iodine. The iodinated resin bed has been recharged up to eight times during continuous use to permit an extended life to the system. The bed of iodine crystals is connected in parallel with the iodinated resin bed and is activated periodically, e.g., by timer, by measured flow of water, or by iodine residual level, to recharge the bed.

28 Claims, 1 Drawing Sheet

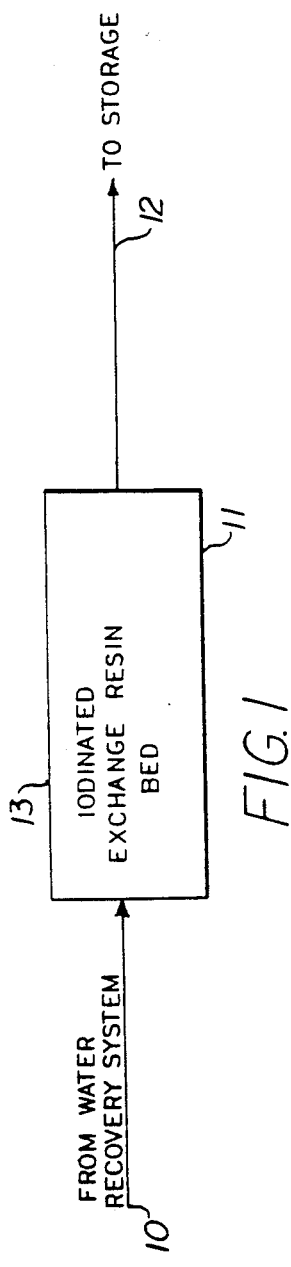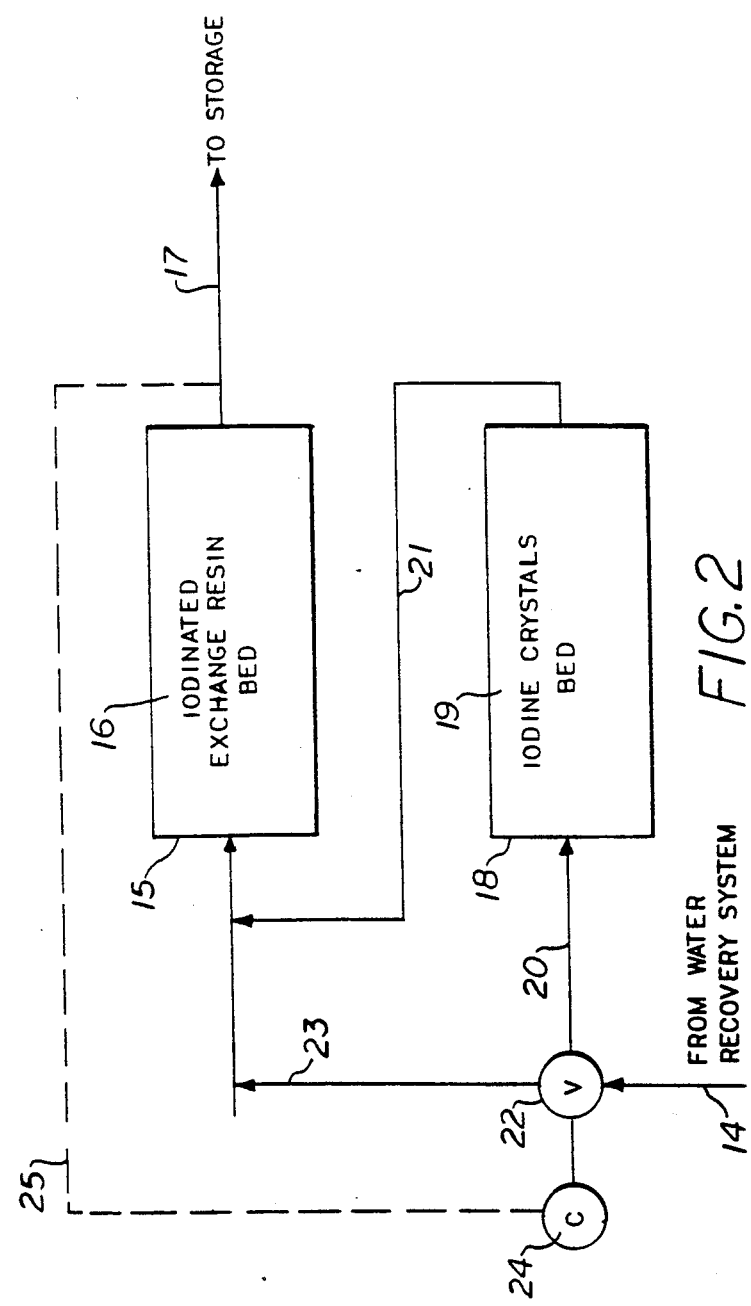

REGENERABLE BIOCIDE DELIVERY UNIT

ORIGIN OF THE INVENTION

The invention described herein was made in the performance of work under a NASA contract, and is subject to the provisions of Public Law 96-517 (35 USC §202 et seq.) in which the Contractor has elected not to retain title.

BACKGROUND OF THE INVENTION

1. Field of the Invention

This invention relates generally to water purification systems and more particularly to a water purification accomplished by introduction of molecular iodine into the water supply to impart a desired iodine residual by use of an iodinated exchange resin bed which is recharged periodically during use.

2. Brief Description of the Prior Art

The use of chlorine for water purification is well known. Iodine has also been used for the same purpose.

In space activities, i.e., space shuttle, orbiter lab, Lunar base, Mars base, deep space missions, etc., continuous, long-term microbial control in the water supply for potable, hygiene, and experimental water has been accomplished by introduction of molecular iodine into the water supply to impart a desired iodine residual. The water is passed through an iodinated anion exchange resin bed which releases molecular iodine.

Lambert and Fina U.S. Pat. Nos. 3,817,860 and 3,923,366 disclose methods of disinfecting water and demand bacteriacides but do not show in situ regeneration.

Barnes U.S. Pat. No. 4,888,118 discloses a water purification process in which the water is passed through a mass of nylon 4 complexed with iodine. The treated water is subsequently passed through nylon 4 to remove iodine from the water. The nylon 4 used in both treatment zones can be in any form, preferably a form having a high surface area, e.g., powder, fiber, drawn or undrawn, staple fiber, knitted or non-woven fabrics or pulp fibrils.

Keblys et al U.S. Pat. No. 4,131,645 discloses an iodine recovery process by repeated cycles of passing an iodine-containing brine through a basic ion exchanger to absorb iodine and then oxidizing adsorbed iodide to iodine by passing an acidified aqueous iodate solution through the exchange resin.

Abrams U.S. Pat. No. 4,849,111 discloses a method and apparatus for regenerating a dynamic adsorber system which removes a contaminant from a fluid. The bed is periodically cleansed by flowing a clean fluid therethrough.

The present invention is distinguished over the prior art in general, and these patents in particular by a method and apparatus disclosed for maintaining continuous, long-term microbial control in the water supply for potable, hygiene, and experimental water for space activities, i.e., space shuttle, orbiter lab, Lunar base, Mars base, deep space missions, etc., as well as various terrestrial applications. The water purification is accomplished by introduction of molecular iodine into the water supply to impart a desired iodine residual. The water is passed through an iodinated anion exchange resin bed. The iodine is bound as $I_n{}^-$, where n is an odd integer greater than three, at the anion exchange sites and releases $I_2$ into the water stream flowing through the bed. Suitable resins are strong base anion exchange resins such as AMBERLITE IRA 401S (Rohm & Haas); DOWEX SBR (Dow Chemical); and IONAC ASB-1P (Sybron Corp.). The concentration of $I_2$ in the flowing water gradually decreases and the ion-exchange bed has had to be replaced. In a preferred embodiment, a bed of iodine crystals is provided with connections for flowing water therethrough to produce a concentrated (substantially saturated) aqueous iodine solution which is passed through the iodinated resin bed to recharge the bed with bound iodine. The iodinated resin bed has been recharged up to eight times during continuous use to permit an extended life to the system. The bed of iodine crystals is connected in parallel with the iodinated resin bed and is activated periodically, e.g., by timer, by measured flow of water, or by iodine residual level, to recharge the bed.

SUMMARY OF THE INVENTION

It is therefore an object of the present invention to provide a new and improved method and apparatus for maintaining continuous, long-term microbial control in the water supply for potable, hygiene, and experimental water for space activities, i.e., space shuttle, orbiter lab, Lunar base, Mars base, deep space missions, etc., as well as terrestrial applications.

It is another object of this invention to provide a new and improved water purification process or method by introduction of molecular iodine into the water supply to impart a desired iodine residual.

Another object of this invention is to provide a new and improved water purification process or method by introduction of molecular iodine into the water supply to impart a desired iodine residual wherein the water is passed through an iodinated anion exchange resin bed.

Another object of this invention is to provide a new and improved water purification by introduction of molecular iodine into the water supply to impart a desired iodine residual wherein the water is passed through an iodinated anion exchange resin bed in which the iodine is bound as $I_n{}^-$, where n is an odd integer greater than three, at the anion exchange sites and releases $I_2$ into the water stream flowing through the bed.

Still another object of this invention is to provide a new and improved water purification by introduction of molecular iodine into the water supply to impart a desired iodine residual wherein the water is passed through an iodinated anion exchange resin bed, preferably AMBERLITE IRA 401S (Rohm & Haas); DOWEX SBR (Dow Chemical); and IONAC ASB-1P (Sybron Corp.), in which the iodine is bound as $I_n{}^-$, where n is an odd integer greater than three, at the anion exchange sites and releases $I_2$ into the water stream flowing through the bed.

Still another object of this invention is to provide a new and improved water purification by introduction of molecular iodine into the water supply to impart a desired iodine residual wherein the water is passed through an iodinated anion exchange resin bed, the concentration of $I_2$ in the flowing water gradually decreases and the ion-exchange bed is recharged by treatment with a strong aqueous iodine solution.

A further object of this invention is to provide an improved water purification by introduction of molecular iodine into the water supply to impart a desired iodine residual wherein the water is passed through an iodinated anion exchange resin bed, the concentration of $I_2$ in the flowing water gradually decreases and the ion-exchange bed is recharged by treatment with an aqueous iodine solution produced by flowing water through a bed of iodine crystals having connections in parallel with the ion-exchange bed.

A further object of this invention is to provide an improved water purification by introduction of molecular iodine into the water supply to impart a desired iodine residual wherein the water is passed through an iodinated anion exchange resin bed, the concentration of $I_2$ in the flowing water gradually decreases and the ion-exchange bed is recharged by treatment with an aqueous iodine solution produced by flowing water through a bed of iodine crystals having connections in parallel with the ion-exchange bed and activated periodically, e.g., by timer, by measured flow of water, or by iodine residual level, to recharge the bed.

Other objects of the invention will become apparent from time to time throughout the specification and claims as hereinafter related.

The above noted objects and other objects of the invention are accomplished by a novel apparatus for maintaining continuous, long-term microbial control in the water supply for potable, hygiene, and experimental water for space activities, i.e., space shuttle, orbiter lab, Lunar base, Mars base, deep space missions, etc., as well as various terrestrial applications. The water purification is accomplished by introduction of molecular iodine into the water supply to impart a desired iodine residual. The water is passed through an iodinated anion exchange resin bed. The iodine is bound as $I_n^-$, where n is an odd integer greater than three, at the anion exchange sites and releases $I_2$ into the water stream flowing through the bed. Suitable anion exchange resins are AMBERLITE IRA 401S (Rohm & Haas); DOWEX SBR (Dow Chemical); and IONAC ASB-1P (Sybron Corp.). The concentration of $I_2$ in the flowing water gradually decreases and the ion-exchange bed has had to be replaced. In a preferred embodiment, a bed of iodine crystals is provided with connections for flowing water therethrough to produce a concentrated (substantially saturated) aqueous iodine solution which is passed through the iodinated resin bed to recharge the bed with bound iodine. The iodinated resin bed has been recharged up to eight times during continuous use to permit an extended life to the system. The bed of iodine crystals is connected in parallel with the iodinated resin bed and is activated periodically, e.g., by timer, by measured flow of water, or by iodine residual level, to recharge the bed.

BRIEF DESCRIPTION OF THE DRAWINGS

FIG. 1 is a flow diagram of a water purification system wherein the water is passed through an iodinated anion exchange resin bed.

FIG. 2 is a flow diagram of a water purification system wherein the water is passed through an iodinated anion exchange resin bed and a bed of iodine crystals has connections for flowing water therethrough to produce a concentrated (substantially saturated) aqueous iodine solution which is passed through the iodinated resin bed to recharge the bed with bound iodine, the bed of iodine crystals being connected in parallel with the iodinated resin bed and activated periodically, e.g., by timer, by measured flow of water, or by iodine residual level, to recharge the bed.

DESCRIPTION OF THE PREFERRED EMBODIMENT

Referring to the drawings by numerals of reference, and more particularly to FIG. 1, there is shown a flow diagram of a system for purification of water by passing water from a water recovery system 10 through a bed 11 of iodinated anion exchange resin to storage and use 12. The bed 11 is a container having an inlet and an outlet which contains the iodinated anion exchange resin.

The anion exchange resins 13 used in the exchange resin bed is a strong base ion exchange resin. These resins have amine or quaternary amine sites on the resin backbone which is generally of the polystyrene type. The more preferred resins are the strongly basic anion exchange resins such as those having a quaternary ammonium site, e.g., polystyrene trimethylammonium chloride resins. A useful resin of this type is DOWEX SBR (Dow Chemical), although other strong base anion exchange resins such as AMBERLITE IRA 401S (trademark of Rohm and Haas Co.); and IONAC ASB-1P (Sybron Corp.) could be used.

When these anion exchange resins are treated with iodine until completely iodinated, iodine is bound at the basic sites in the resin in the form of $I_n^-$, where n is an odd integer greater than three. When water is passed through the iodinated exchange resin bed, as shown in FIG. 1, molecular iodine ($I_2$) is washed out of the resin slowly to produce an effective $I_2$ residual in the flowing water leaving $I^-$ at the basic sites in the resin.

Over a period of time, the iodine content of the resin decreases and the $I_2$ residual in the effluent water drops markedly. A long term washout test was conducted with a 3.8 cc. bed of AMBERLITE IRA 401S (trademark of Rohm & Haas Co.) using a water flow rate of 8.5 ml./min. at 70° F. The $I_2$ residual in the effluent water is set forth in Table I below.

TABLE I

| 401S IODINATED RESIN WASHOUT | | | | | | | |
|---|---|---|---|---|---|---|---|
| Throughput liters/cc. | 0 | 10 | 20 | 30 | 40 | 50 | 60 |
| $I_2$ resid. mg./l. | 4.4 | 3.0 | 2.0 | 1.6 | 1.2 | 1.1 | 1.0 |

Over the period of this test, the $I_2$ residual decreased to a point where it was necessary to replace the resin.

In long duration programs such as Pathfinder and Space Station Freedom, it is necessary to have closed loop life support technology that provides long-term life support at minimum resupply costs. In the Space Station Freedom, 20 installations of the iodinated exchange resin beds have been identified, each with a 90 day life. In 30 years of proposed operation, the station would require 2,400 replacement units for water purification. This problem has led to the development of the system of regeneration described below.

In preparation for testing a process for regeneration of the iodinated exchange resin, determinations were made of iodine solubility in water as in Table II below.

TABLE II

| SOLUBILITY OF IODINE IN WATER | | | |
|---|---|---|---|
| Temp. °C. | $I_2$ mg./l. | Temp. °C. | $I_2$ mg./l. |
| 0 | 162 | 60 | 1,060 |
| 20 | 293 | 70 | 1,510 |
| 25 | 340 | 80 | 2,170 |
| 30 | 399 | 90 | 3,120 |

TABLE II-continued

| SOLUBILITY OF IODINE IN WATER | | | |
|---|---|---|---|
| Temp. °C | $I_2$ mg/l | Temp. °C | $I_2$ mg/l |
| 40 | 549 | 100 | 4,480 |
| 50 | 760 | | |

Next, tests, were run on the dissolution of iodine in water flowing through a regeneration bed. The regeneration bed is a container having an inlet and an outlet which contains the iodine crystals. Small regeneration beds were prepared, viz., 1.7 cc., 3.3 cc. and 5.0 cc., loaded loosely with iodine crystals, 3.8 g., 8.0 g. and 11.5 g., respectively, and water passed therethrough at a flow rate of 8.5 ml./min. The effluent $I_2$ concentration was measured directly at 460 nm using a Beckman DB spectrophotometer as reported in Table III.

TABLE III

| CRYSTALLINE IODINE BED WASHOUT | | | | | | | | | |
|---|---|---|---|---|---|---|---|---|---|
| 5.0 cc. Bed | | | | | | | | | |
| Throughput - liters | 5 | 10 | 15 | 20 | 25 | 30 | 35 | 40 | 45 |
| mg. $I_2$/l | 260 | 270 | 250 | 240 | 225 | 200 | 150 | 120 | 70 |
| 3.3 cc. Bed | | | | | | | | | |
| Throughput - liters | 5 | 10 | 15 | 20 | 25 | 30 | 35 | 40 | 45 |
| mg. $I_2$/l | 220 | 250 | 200 | 175 | 140 | 80 | 50 | | |
| 1.7 cc. Bed | | | | | | | | | |
| Throughput - liters | 5 | 10 | 15 | 20 | 25 | 30 | 35 | 40 | 45 |
| mg. $I_2$/l | 180 | 200 | 120 | 50 | 25 | | | | |

Further tests relating specific conductance, pH and effluent $I_2$ concentration showed that effluent iodine levels from the regeneration bed are insensitive to influent conductivity. A determination of the effect of residence time of water in the regeneration bed showed an effluent iodine concentration of 200 mg/l. at 0.2 min., 250 mg/l. at 0.4 min., and 270 mg/l. at 0.6 min. residence time in bed.

In FIG. 2, there is shown a flow diagram of a system for purification of water by passing water from a water recovery system 14 through a bed 15 of iodinated anion exchange resin 16 to storage and use 17.

As in FIG. 1, the anion exchange resins 17 used in the exchange resin bed is a strong base ion exchange resin. These resins have amine or quaternary amine sites on the resin backbone which is generally of the polystyrene type. The more preferred resins are the strongly basic anion exchange resins such as those having a quaternary ammonium site, e.g., polystyrene trimethylammonium chloride resins. A useful resin of this type is AMBERLITE IRA 401S (trademark of Rohm and Haas Co.), although other strong base anion exchange resins such as DOWEX SBR (Dow Chemical); and IONAC ASB-1P (Sybron Corp.) could be used. The bed 15 is a container having an inlet and an outlet which contains the iodinated anion exchange resin.

Regeneration of the resin bed 15 was carried out using the data developed above. A regeneration bed 18 containing iodine crystals 19 (a container having an inlet and an outlet which contains the iodine crystals) is connected in parallel to iodinated exchange resin bed 15 by conduits 20 and 21. An automatically operated three-way valve 22 connects water supply 14 to conduit 20 leading to regeneration bed 18 and to conduit 23 connecting to iodinated exchange resin bed 15. A controller 24 having an optional connection 25 to a sensor in storage line 17 controls valve 22. Three way valve 22 has a normal position directing water flow to iodinated exchange resin bed 15 and shutting off flow to regeneration bed 18.

Controller 24 is operable periodically to turn three way valve 22 to a position directing water flow through regeneration bed 18 and shutting off flow directly to iodinated exchange resin bed 15. Automatic controller, shown schematically at 24, may be a timer to operate valve 22 at timed intervals or may be responsive to volume of water passing through iodinated exchange resin bed 15 or to the iodine residual in the water flowing to storage 17 to operate valve 22 after a predetermined volume of water flow or a predetermined drop in $I_2$ residual. The operation of valve 22, as described, shifts the path of water flow from a direct path into iodinated exchange resin bed 15 to a path through regeneration bed 18 and then into iodinated exchange resin bed 15, after a predetermined time or after a predetermined flow of water through iodinated exchange resin bed 15 or after a predetermined drop in $I_2$ residual.

A long term test of the above equipment was carried out to test the regeneration concept. The switching of the water flow between direct flow through resin bed 15 and flow through regeneration bed 18 into resin bed 15 was performed manually based on $I_2$ residual data obtained on the effluent during the test.

The system was operated 24 hours per day for 114 days. The total water processed was 1,236 liters. The average effluent $I_2$ concentration as 2.9 mg./1. The regeneration bed 18 initially contained 5.0 cc. (9.0 g.) iodine crystals. The exchange resin bed 15 contained 2.5 cc. of iodinated AMBERLITE IRA 401S. The water flow rate was 8.5 cc./min. This flow rate corresponds to a contact time that is 33% less than the design value for use in the NASA shuttle in order to expedite the test. For the exchange resin bed 15, the effluent iodine concentration is independent of flow rate. However, a higher exchange resin bed 15 effluent is achieved using a higher flow rate during the regeneration step.

The $I_2$ residual in the effluent was monitored and plotted against liters of water throughput. When the residual dropped from 4.0 to about 1.0, the flow was switched through the iodine-containing regeneration bed 18 and then through exchange resin bed 15 for about 0.8 min. until the resin was re-iodinated to at least the initial iodine level. After the resin bed 15 was regenerated, the water flow was switched back to direct flow through bed 15 and the monitoring of iodine residual continued.

At the start of the test, the exchange resin bed 15 contained 3.8 cc. resin and the effluent iodine content was 4.0 mg./l. After a throughput of 197 liters, the resin bed volume was reduced to 2.5 cc. for the remainder of the test to increase the number of regenerations that could be obtained during the 3⅝ months test. A total of 8 regenerations were accomplished, and none of the data indicated that the exchange resin could not be regenerated further. Each of the regenerations raised the iodine content of the resin bed 15 sufficiently to produce an $I_2$ residual in the water effluent in excess of the initial values of 4.0 mg./l. The first five regenerations were performed at an accelerated flow rate and a regeneration spike was observed that reached a maximum value of 6-11 mg./l. residual $I_2$. Regenerations were done after a drop in $I_2$ residual to about 1.0 mg./l. at water throughputs of 200 l., 300 l., 500 l., 670 l., and 800 l., respectively. For the last three regenerations, at water throughputs of 980 l., 1080 l., and 1,200 l., respectively, the flow rate during regeneration was reduced to 3.0 ml./min., a residence time of 0.8 min. in bed 15 which eliminated the spike. The residence time of 0.8 min. has been found adequate to regenerate resin bed 15 to the initial iodine level.

This long term test has proved the feasibility of repeated regeneration of the resin bed 15. The life of the resin bed 15 was increased by a factor of eight with no decrease in performance. The life of resin bed 15 was increased from 60 l. water per cc. of iodinated resin to 500 l. per cc. Eight regenerations were performed consuming 3.57 g. iodine. It was not possible to project the ultimate life of resin bed 15 since no physical attrition, dysfunction or inconsistencies in performance were noted. At the end of the 114 day test, the resin was fully charged, producing 4.0 mg./l $I_2$ residual. The test has demonstrated that the system is operative for long term water purification in closed loop life support systems such as those in space shuttle, orbiter lab, Lunar base, Mars base, Pathfinder, Space Station Freedom, deep space missions, etc.

While this invention has been shown fully and completely with special emphasis on certain preferred embodiments, it should be understood that within the scope of the appended claims the invention may be practiced otherwise than as specifically described herein.

We claim:

1. A method of treating water to produce a predetermined $I_2$ residual therein comprising
   providing a bed of anion exchange resin iodinated to a selected iodine content,
   flowing water requiring purification through said iodinated anion exchange resin to remove iodine from said resin and produce said predetermined $I_2$ residual therein,
   continuing flowing said water through said bed of anion exchange resin until the effluent iodine content is reduced to a selected lower level,
   preparing an aqueous solution of $I_2$,
   passing said solution through said bed to re-iodinate said resin to said selected iodine content, and
   flowing further amounts of water requiring purification through said iodinated anion exchange resin to remove iodine from said resin and produce said predetermined $I_2$ residual therein.

2. A method according to claim 1 in which
   said resin is iodinated to a level sufficient to produce an $I_2$ residual in excess of 1.0 mg./liter in water passing therethrough.

3. A method according to claim 1 in which
   said iodine solution contains at least 1 mg. $I_2$ per liter.

4. A method according to claim 1 in which
   said iodine solution is prepared and passed through said resin bed continuously during the regeneration step.

5. A method according to claim 1 including
   providing a bed of iodine crystals,
   continuously passing water through said iodine crystals to produce said iodine solution and continuously passing said iodine solution through said resin bed during the regeneration step.

6. A method according to claim 1 including
   providing a bed of iodine crystals,
   continuously passing water through said iodine crystals to produce said iodine solution containing at least 1 mg. $I_2$ per liter, and continuously passing said iodine solution through said resin bed during the regeneration step.

7. A method according to claim 1 including
   said resin is a polymer having substituted ammonium functionality.

8. A method according to claim 7 in which
   said resin is a polymer having quaternary ammonium functionality.

9. A method according to claim 1 in which
   said resin is a strong base anion exchange resin.

10. A method according to claim 9 including
    providing a bed of iodine crystals,
    continuously passing water through said iodine crystals to produce said iodine solution and continuously passing said iodine solution through said resin bed during the regeneration step.

11. A method according to claim 9 including
    providing a bed of iodine crystals,
    continuously passing water through said iodine crystals to produce said iodine solution containing at least 1 mg. $I_2$ per liter, and continuously passing said iodine solution through said resin bed during the regeneration step.

12. A method according to claim 9 including
    providing a bed of iodine crystals, and
    passing water through said iodine crystals to produce said iodine solution.

13. A method according to claim 12 including switching the flow of water from a path through said resin bed when the iodine content is reduced to said selected lower level to a path through said bed of iodine crystals and then through said resin bed until said resin bed is re-iodinated, and
    when said resin bed is re-iodinated, switching the flow of water back to a path directly through said resin bed.

14. A method according to claim 12 including
    switching the flow of water from a path through said resin bed when the iodine content is reduced to said selected lower level to a path through said bed of iodine crystals and then through said resin bed until said resin bed is re-iodinated, and
    when said resin bed is re-iodinated, switching the flow of water back to a path directly through said resin bed.

15. A method according to claim 1 including
    providing a bed of iodine crystals, and
    passing water through said iodine crystals to produce said iodine solution.

16. A method according to claim 15 comprising the additional steps of
    again continuing flowing water through said bed of anion exchange resin until the effluent iodine content is reduced to a selected lower level,
    again preparing an aqueous solution of iodine by passing water through said bed of iodine crystals,
    again passing said solution through said resin bed to re-iodinate said resin to said selected iodine content, and
    again flowing further amounts of water requiring purification through said iodinated anion exchange resin to remove iodine from said resin and produce said predetermined iodine residual therein.

17. A method according to claim 15 including
switching the flow of water from a path through said resin bed when the iodine content is reduced to said selected lower level to a path through said bed of iodine crystals and then through said resin bed until said resin bed is re-iodinated, and
when said resin bed is re-iodinated, switching the flow of water back to a path directly through said resin bed.

18. A method according to claim 17 in which
said switching of the path of water flow is by a three way valve positioned to direct flow to said resin bed or to said iodine crystals bed and thence to said resin bed.

19. A method according to claim 18 in which
said three way valve is controlled by a timer.

20. A method according to claim 18 in which
said three way valve is controlled by a sensor responsive to a selected volume of water passing through said resin bed.

21. A method according to claim 18 in which
said three way valve is controlled by a sensor responsive to the $I_2$ residual in the water passing from said resin bed.

22. An apparatus for continuous treatment of water to impart a predetermined residual of $I_2$ therein comprising
a bed of anion exchange resin iodinated to a selected iodine content and having an inlet and an outlet,
a first conduit connected to the inlet of said anion exchange resin bed and connected to a source of water requiring treatment,
a second conduit connected to said anion exchange resin bed outlet and comprising means for discharging treated water therefrom.
a bed of iodine crystals having an inlet and an outlet,
a third conduit connecting said iodine bed outlet to said first conduit,
a fourth conduit connected to said iodine bed inlet and connected to said source of water, and
valve means connected to said first conduit and said fourth conduit and to said source of water for directing flow of water to said second conduit selectively through said bed of iodine crystals and then through said resin bed via said fourth conduit or through only said resin bed via said first conduit.

23. An apparatus according to claim 22 in which
said valve means comprises a three way valve connected between said source of water and said first and fourth conduits.

24. An apparatus according to claim 23 including
automatic means for operating said three way valve to change said direction of water flow after a selected amount of iodine has been eluted from said exchange resin bed.

25. An apparatus according to claim 24 in which
said automatic means is a timer comprising means for actuating said three way valve after a selected time.

26. An apparatus according to claim 24 in which
said automatic means includes a sensor responsive to the volume of water passing through said second conduit to actuate said three way valve after a selected volume of water has passed through said second conduit.

27. An apparatus according to claim 24 in which
said automatic means includes a sensor responsive to the $I_2$ residual in water passing through said second conduit to actuate said three way valve when said $I_2$ residual has decreased to a selected level.

28. A method of treating water to produce a predetermined $I_2$ residual therein comprising
providing a bed of anion exchange resin iodinated to a selected iodine content,
flowing water requiring purification through said iodinated anion exchange resin to remove iodine from said resin and produce said predetermined $I_2$ residual therein,
continuing flowing said water through said bed of anion exchange resin until the effluent iodine content is reduced to a selected lower level,
preparing in-situ an aqueous solution of $I_2$, passing said solution through said bed in-situ to re-iodinate said resin to said selected iodine content, and
flowing further amounts of water requiring purification through said iodinated anion exchange resin to remove iodine from said resin and produce said predetermined $I_2$ residual therein.

* * * * *